United States Patent [19]

Acker

[11] 4,167,069

[45] Sep. 11, 1979

[54] DEVICE FOR ASSISTING THE MARKING OF TESTS

[76] Inventor: Charles W. Acker, 203 Ava Rd., Toronto 10, Canada

[21] Appl. No.: 832,592

[22] Filed: Sep. 12, 1977

[30] Foreign Application Priority Data

Sep. 20, 1976 [GB] United Kingdom ............... 38814/76

[51] Int. Cl.² ............................................... G09B 3/04
[52] U.S. Cl. .................................. 35/9 F; 35/31 R; 35/31 G; 35/48 A
[58] Field of Search ............ 35/48 A, 9 E, 9 F, 31 R, 35/31 E, 31 F, 31 G

[56] References Cited

U.S. PATENT DOCUMENTS

| 1,641,982 | 9/1927 | McDade ................................. 35/9 E |
| 2,693,646 | 11/1954 | Hawkins ................................ 35/9 E |
| 3,152,403 | 10/1964 | Betz ....................................... 35/9 F |
| 3,362,088 | 1/1968 | Kusch .................................... 35/9 F |
| 3,410,002 | 11/1968 | Mulholland et al. ................ 35/31 R |
| 3,526,974 | 9/1970 | Van Derveer et al. .............. 35/31 R |

*Primary Examiner*—William H. Grieb

[57] ABSTRACT

A mask with apertures is provided for use with a question or problem sheet having questions or problems in defined areas of the sheet, and answers outside such area. The mask is designed to hold such sheet in registration, revealing the defined areas and occluding the areas with the answers.

2 Claims, 7 Drawing Figures

FIG.1

DEVICE FOR ASSISTING THE MARKING OF TESTS

This invention relates to means for assisting in the performance and marking of written tests. The written tests for which the invention is designed are those wherein the problem or question is set out upon a sheet and the student's answer is indicated by a written answer or mark on the sheet where the problem appears.

With tests of this type the answers must be graded either by a teacher or supervisor or by the students or examinees themselves. When the correct answers are provided on a separate sheet the inconvenience of continually shifting the eyes from the candidate's sheet to the answer sheet is inconvenient and a cause of marking error. Where the marking of the tests is marked by the candidates or students themselves or their fellow candidates, the statistical chance of error is vastly increased.

The problems above outlined are enhanced both as to inconvenience and expense where, as is common, the tests are provided on sheets made by a duplicating machine. If the tests are made in this way, then a sheet with the answers on must be specially prepared either manually or by a separate duplicating run. The error and inconvenience of moving the eye from the question sheet to the answer sheet remains.

Although the invention is particularly designed for use with sheets prepared on the duplicating machine, it is not limited to such sheets and may be used with printed sheet or sheets prepared in any other manner.

The invention is designed to allow the use of a sheet having indicia thereon stating problems or questions to be solved in defined areas (called "question areas" hereafter) and indicia thereon stating the solutions or answers to the questions or problems, in other defined areas (called "answer areas" thereafter). The invention provides: a mask having apertures, the apertures in said mask being so arranged that when the mask overlies said sheet and in registration therewith, the apertures leave said question areas exposed while the mask material occludes the answer areas, and the invention provides means for mechanically maintaining such sheet in registration with said mask.

It will be appreciated that this arrangement allows the provisions of a sheet, produced by duplicating machine or otherwise, which has both question and answers on the same sheet and closely spatially related. The mask overlying the sheet prevents the pupil or examinee from seeing the answers and requires him to answer the question or solve the problem, (space for answering the problem is usually provided in each ("question area").

When the pupil or examinee has completed writing his answers the marking may be performed by the examiner, a fellow pupil or the examinee himself by removing the sheet from the mask to expose the answers. The correct answers are conveniently located for the marker in close proximity to the examinee's answers for easy comparison without extra effort, extra sheets or extra equipment.

Although the convenience and promptness of marking are important advantages there are other advantages which may be equally important. The device allows self-checking by the student himself since the student is asked to answer the questions or problems with the answers hidden, then to uncover the answers and check his results. Closely associated with self-checking is the fact that the invention allows the student to proceed through so called programmed learning, i.e. step-by-step learning and at his own speed. Such procedures, prior to this invention, required expensive and complex equipment. Finally the grid design itself, in breaking up the open page and imposing a pattern thereon, assists in fundamental perceptual learning processes, which is of special importance to children with learning disabilities.

Preferably the registration between the sheet and the mask is achieved by providing rearward projections on the mask which are arranged to bear on the side edges of the sheet and maintain it in registration with the apertures in the mask.

In the preferred embodiment the rear projections are constituted by a shallow wall extending backward from the periphery of the mask and perpendicular to the intended contour of the question sheet therein.

In drawings which illustrate a preferred embodiment of the invention:

FIG. 1 shows an arithmetic question sheet designed for use with the invention;

Figure 1:
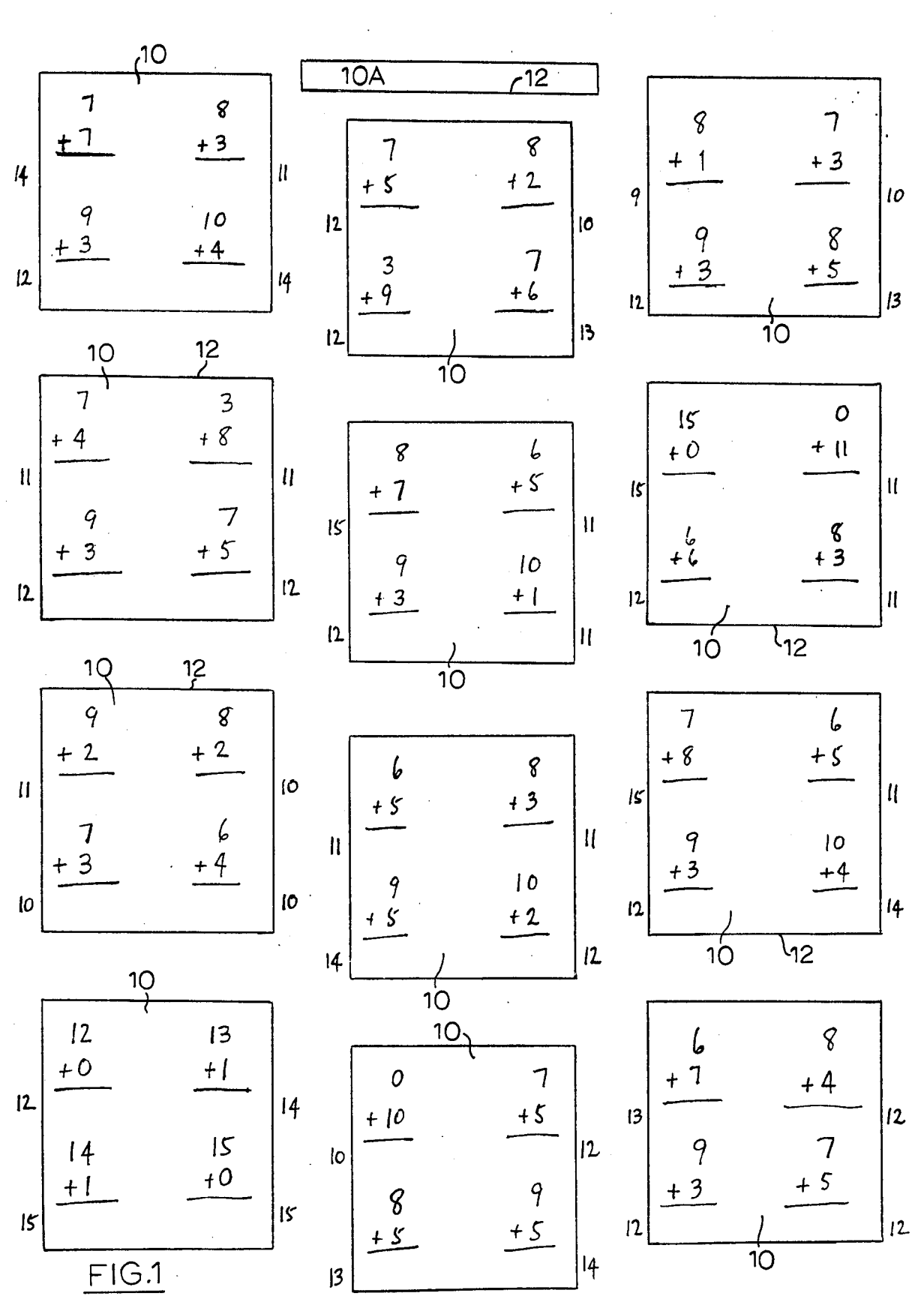
Figure 2:
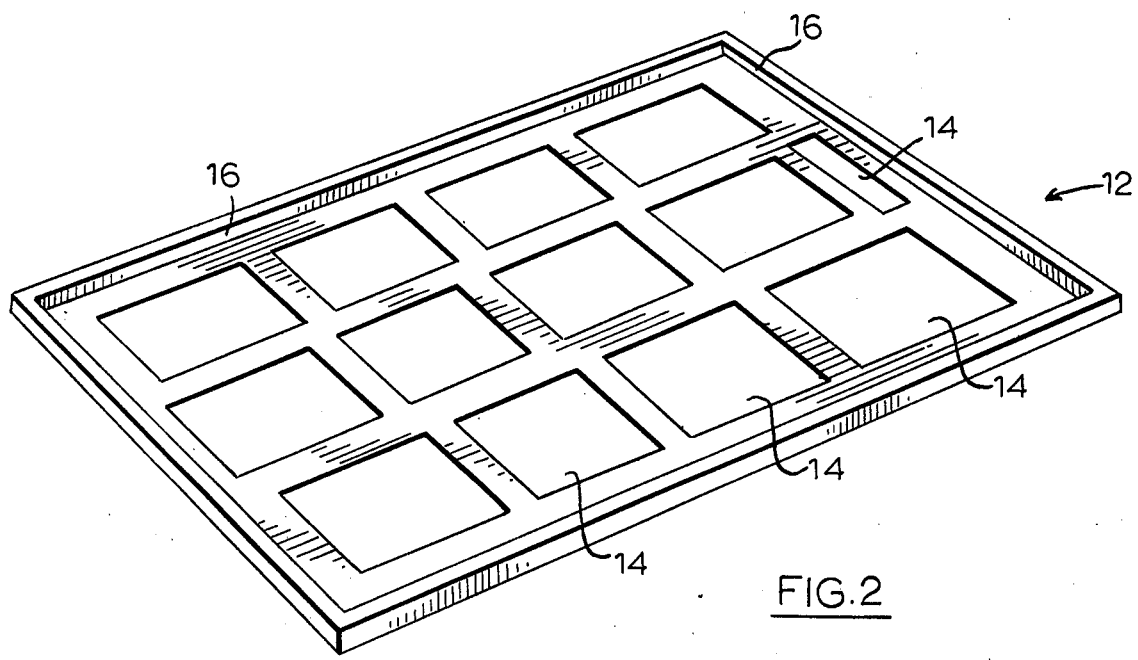
FIG. 2 shows a bottom view of the mask for use with the invention.
Figure 3:
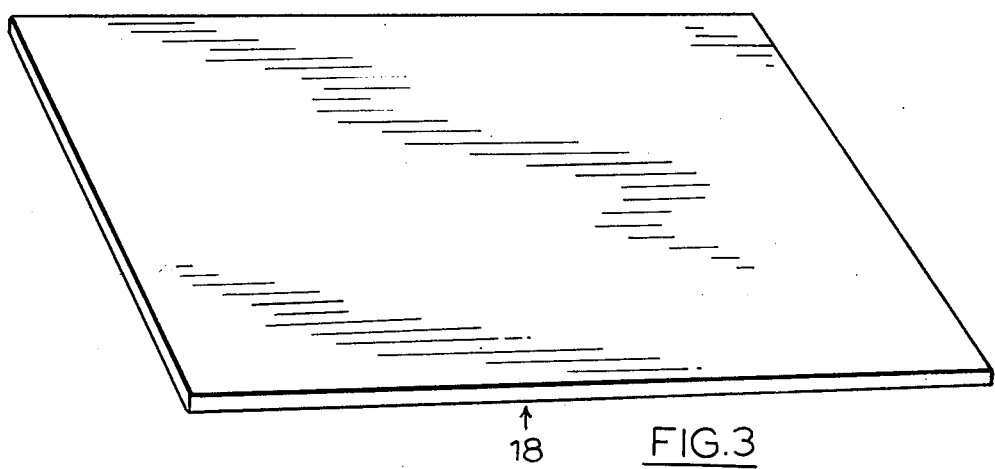
FIG. 3 shows an insert or backing for insertion in the mask of FIG. 2.
Figure 4:
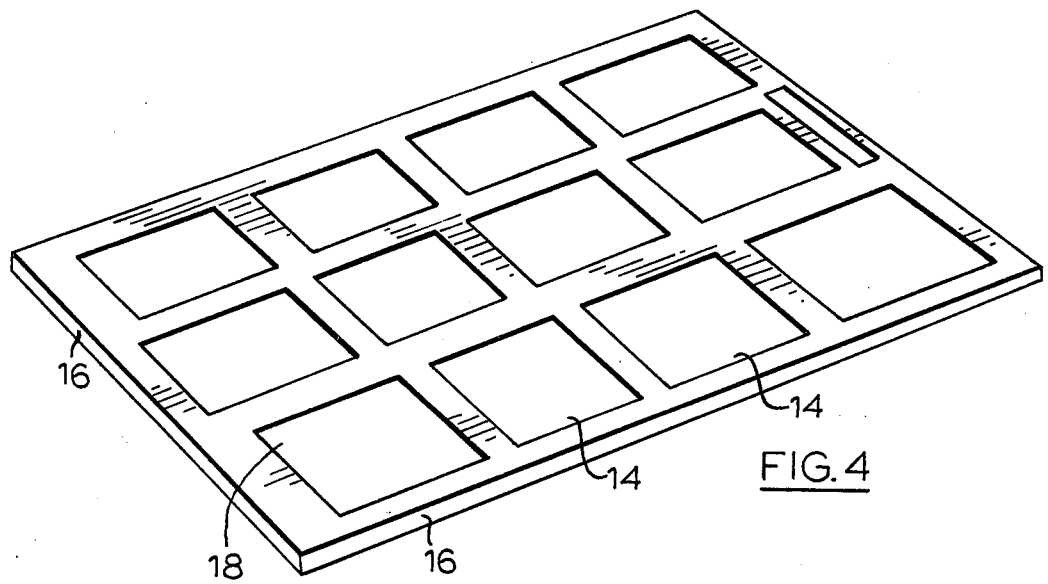
FIG. 4 shows a top view of the mask of FIG. 2 with the insert of FIG. 3 but without the problem page of FIG. 1.

In the drawings, FIG. 1 shows an arithmetic question sheet 11 prepared (most often but not necessarily) by a duplicating machine. The question areas 10 of the question sheet which are to be seen by the student writing the test are shown enclosed by frame lines 12. These areas 10 contain arithmetic problems to be solved and one, 10A, is provided for the student to insert his name or other indicia for the purposes of identification. The areas of the sheet outside the framed question areas 10 are the answer areas and are not intended to be seen by the student. The answer areas contain the answers to the arithmetic problem posed and are placed as conveniently as possible outside areas 10 but near the arithmetic problems to which they correspond.

The sheet 10 will be (preferably) a standard size for use with a duplicating machine or other means of reproduction. It is preferred to use paper of a size $8\frac{1}{2}$ inches by 11 inches.

The problems need not of course be arithmetic but may be of any topic expressed inside the areas 10 and in any suitable format (e.g. multiple choice), with the answers suitably located outside areas 10.

The mask 12 is provided with apertures 14 shaped and located to expose areas 10 and occlude the other areas of the question sheet, when the question sheet is placed below and in registration with the mask 12. Registration means are provided for causing mechanical alignment of the sheet with the mask. Preferably this is achieved by providing the apertured planar member forming the mask with rearwardly extending peripheral walls 16 located to bear on the edges of sheet 10 and which maintain the sheet in registration. The depth of the walls 16 is preferably chosen to receive not only the sheet but also a backing insert 18 designed to hold the sheet 11 against the back of the mask and also to provide a backing for the sheet when the student is writing thereon. Thus the registration means, here embodied by walls 16 maintains the backing insert against lateral movement. If desired the backing insert 18 may be hinged to one of the walls 18 to pivot into position after the sheet is inserted in the mask.

Figure 5:
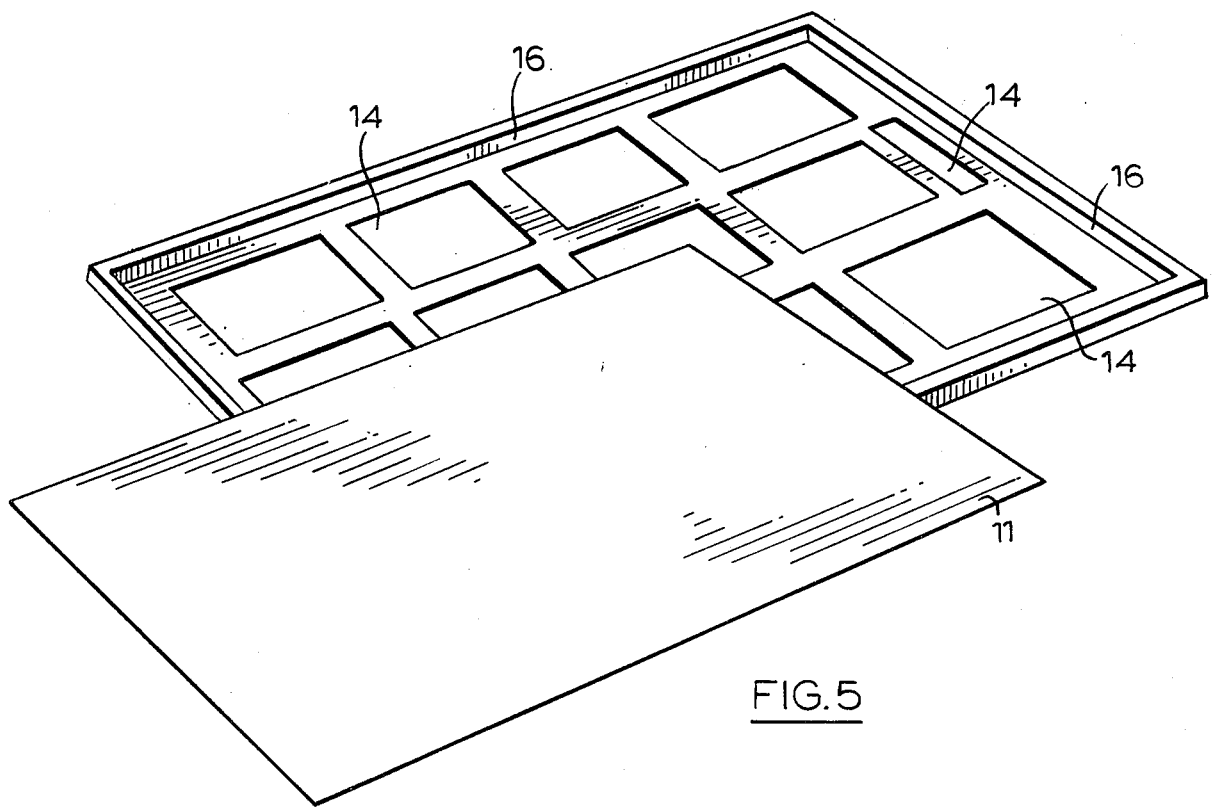
FIG. 5 shows the sheet of FIG. 1 (inverted) being inserted in the mask of FIG. 2 (also inverted)
Figure 6:
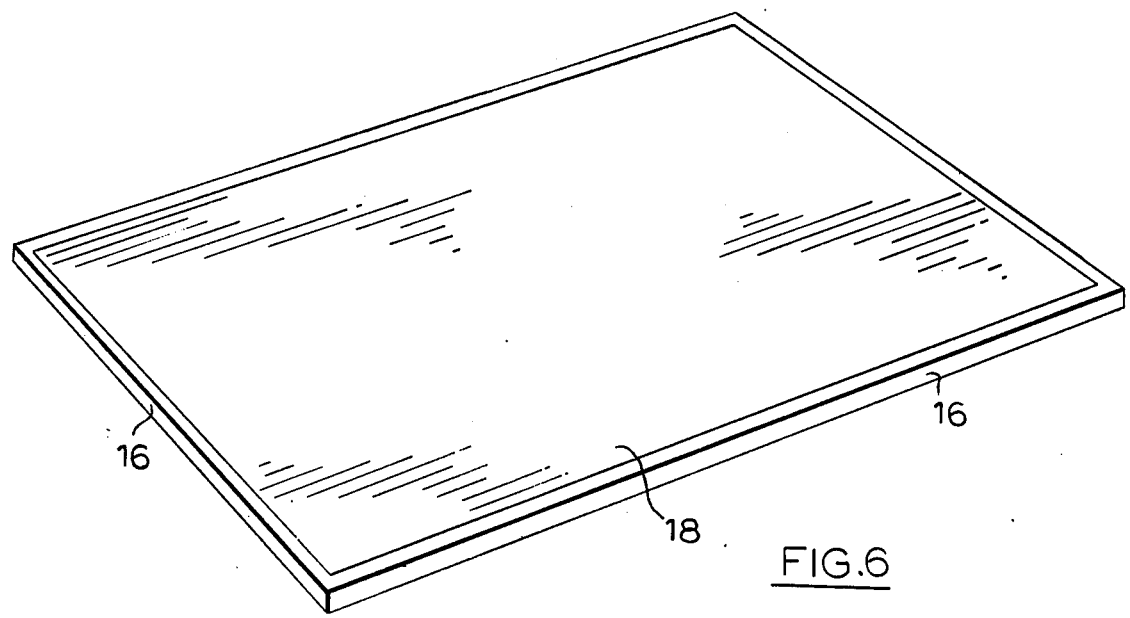
FIG. 6 shows (with the members inverted) the backing of FIG. 3 inserted in the mask to hold the question sheet in place.

The sheet 11 is prepared with the questions inside question areas 10 and the answers outside. The sheet is then inserted in the back of mask 12 as shown in FIG. 5 with the written side of the sheet facing the back of the mask in the correct orientation. The insert 18 is then placed inside the mask (as shown in FIG. 6) to hold the sheet 11 in place and to form a backing when the sheet 11 is written on by the student.

Figure 7:
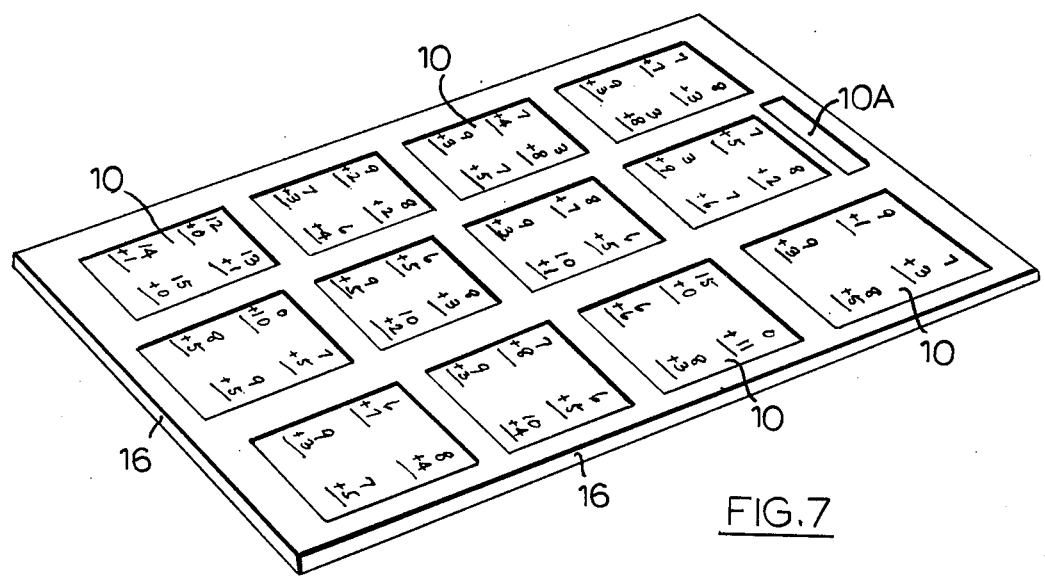
FIG. 7 shows the members of FIG. 6 right side up and shows the question sheet as seen by the pupil being tested.

The test is then ready for the student as shown in FIG. 7. The student then writes his own answers in the areas 10 without knowledge of the answers in the occluded answers areas. When the student is finished the sheet 11 is removed from the mask 12 and the answers exposed for easy marking as previously discussed.

I claim:

1. For use with a question, or problem sheet having problems or questions in defined areas on one side of the sheet and answers respectively corresponding to such problems located outside said defined areas, a mask having apertures shaped and dimensioned so that when the mask overlies said sheet in predetermined registration therewith, the apertures leave said question areas exposed while the mask material occludes the answer areas, said mask being provided with projections rearwardly extending therefrom located to bear on the edges of said sheet and ensure the registration of the sheet areas with the mask apertures, said mask with said projections being arranged, when the mask is located forward side down, to define an open topped receptacle wherein said sheet may be inserted, with said one side down, and moved flatwise toward the mask into registration position.

2. For use, as claimed in claim 1 in combination with a backing insert designed to overlie said sheet when said mask is forward side down and to be retained against lateral projection by said projections, the length of said projections being sufficient to guide said sheet and said insert, and wherein the open-topped receptacle defined by said mask and said projections is arranged to receive said insert placed over said sheet.

* * * * *